US008572692B2

(12) United States Patent
Sunder et al.

(10) Patent No.: US 8,572,692 B2
(45) Date of Patent: Oct. 29, 2013

(54) METHOD AND SYSTEM FOR A PLATFORM-BASED TRUST VERIFYING SERVICE FOR MULTI-PARTY VERIFICATION

(75) Inventors: Divya Naidu Kolar Sunder, Hillsboro, OR (US); Hormuzd Khosravi, Portland, OR (US); David Durham, Bearverton, OR (US); Dan Dahle, Wilsonville, OR (US); Prashant Dewan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 719 days.

(21) Appl. No.: 12/215,907

(22) Filed: Jun. 30, 2008

(65) Prior Publication Data

US 2009/0328164 A1 Dec. 31, 2009

(51) Int. Cl.
*G06F 7/04* (2006.01)
*H04L 9/32* (2006.01)

(52) U.S. Cl.
USPC .............. 726/3; 713/164; 713/176; 713/201

(58) Field of Classification Search
USPC ............................... 726/3; 713/164, 176, 201
See application file for complete search history.

(56) References Cited

U.S. PATENT DOCUMENTS

| 2004/0259640 | A1* | 12/2004 | Gentles et al. | 463/42 |
|---|---|---|---|---|
| 2005/0076226 | A1* | 4/2005 | Boivie et al. | 713/187 |
| 2005/0076266 | A1* | 4/2005 | Costin | 714/38 |
| 2005/0102535 | A1* | 5/2005 | Patrick et al. | 713/201 |
| 2005/0120219 | A1* | 6/2005 | Munetoh et al. | 713/176 |
| 2006/0101047 | A1* | 5/2006 | Rice | 707/101 |
| 2007/0005957 | A1* | 1/2007 | Sahita et al. | 713/156 |
| 2007/0005992 | A1* | 1/2007 | Schluessler et al. | 713/193 |

(Continued)

FOREIGN PATENT DOCUMENTS

| CN | 1625105 A | 6/2005 |
|---|---|---|
| EP | 1689145 A1 | 8/2006 |
| JP | 2005-159905 A | 6/2005 |

(Continued)

OTHER PUBLICATIONS

European Search Report for European Patent Application No. 09251658.2, mailed on Dec. 16, 2009, 4 pages.

(Continued)

*Primary Examiner* — Carl Colin
*Assistant Examiner* — S. Ali Zaidi
(74) *Attorney, Agent, or Firm* — Schwabe, Williamson & Wyatt, P.C.

(57) ABSTRACT

A method and system for a platform-based trust verifying service for multi-party verification. In one embodiment, the method includes a client platform accessing an service provider over a network. Upon accessing the service provider, the client platform receives a request from the service provider for platform measurement and verification. The client platform collects platform information and performs measurement and verification, including performing an integrity manifest comparison. If the integrity manifest comparison indicates a good client platform posture, then the client platform signs the client platform posture and sends an approval notification to the service provider indicating that the client platform has not been compromised. The client platform may then receive the service of the service provider. If the integrity manifest comparison indicates that the client platform posture is not good, then the client platform will send a failure notification to the service provider indicating that the client platform has been compromised.

26 Claims, 5 Drawing Sheets

(56) References Cited

U.S. PATENT DOCUMENTS

| | | | |
|---|---|---|---|
| 2007/0006175 A1* | 1/2007 | Durham et al. | 717/131 |
| 2008/0005560 A1* | 1/2008 | Duffus et al. | 713/164 |
| 2008/0015808 A1* | 1/2008 | Wilson et al. | 702/123 |
| 2008/0022129 A1* | 1/2008 | Durham et al. | 713/189 |

FOREIGN PATENT DOCUMENTS

| | | |
|---|---|---|
| KR | 2008-0050214 A | 6/2008 |
| WO | 2007/124091 A1 | 11/2007 |

OTHER PUBLICATIONS

Office Action for European Patent Application No. 09251658.2, mailed on Jan. 12, 2010, 3 pages of Office Action.

"TCG Specification Architecture Overview", Specification Revision 1.4, Aug. 2, 2007, TCG, 54 pages.

Office Action for Korean Patent Application No. 2009-0058712, mailed on Jan. 13, 2011, 4 pages of English Translation.

Office Action for Chinese Patent Application No. 200910139642.9, mailed Dec. 23, 2011, 10 pages.

Translation of Office Action for Japanese Application No. 2009-153641, mailed Feb. 21, 2012, 4 pages.

Translation of Notice of Allowance for Korean Application No. 2009-0058712, mailed Oct. 17, 2011, 1 page.

Office Action for JP 2009-153641, dated Aug. 14, 2012, 7 pages.

Office Action mailed May 9, 2013 for Chinese Application No. 200910139642.9, 7 pages.

* cited by examiner

METHOD AND SYSTEM FOR A PLATFORM-BASED TRUST VERIFYING SERVICE FOR MULTI-PARTY VERIFICATION

This application is related to U.S. patent application Ser. No. 11/173,851 entitled, "Signed Manifest for Run-Time Verification of Software Program Identity and Integrity," assigned to the assignee of the present invention and filed on Jun. 30, 2005.

BACKGROUND OF THE INVENTION

1. Field of the Invention

The present invention is generally related to security for network enabled computing devices. More particularly, the present invention is related to a method and apparatus for a platform-based trust verifying service for multi-party verification.

2. Description

The World Wide Web is moving towards a services model. A service provider on the World Wide Web controls a subset of services and delivers them to the consumer utilizing a set of distributed capabilities within the purview of a contract. Today there are many malicious users on the World Wide Web, and many devices are not wholly reliable in the information they provide for a variety of reasons. If the consumer platform is compromised, either by malicious code running on the platform or for other reasons, the service provider and/or the services they deliver to the consumer may also be compromised.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the pertinent art(s) to make and use the invention. In the drawings, like reference numbers generally indicate identical, functionally similar, and/or structurally similar elements. The drawing in which an element first appears is indicated by the leftmost digit(s) in the corresponding reference number.

DETAILED DESCRIPTION

Figure 1A:
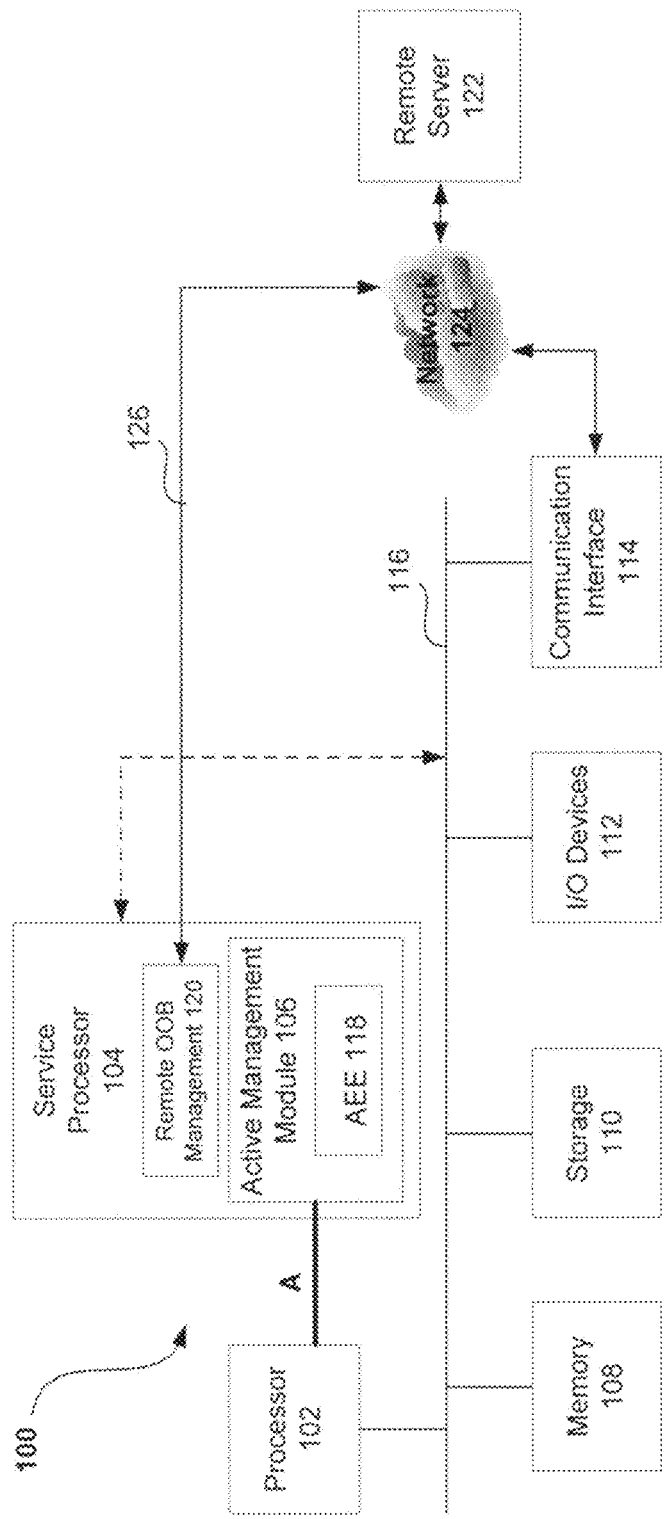
FIG. 1A is a block diagram illustrating an exemplary host computing platform having an active management module according to embodiments of the present invention.

While the present invention is described herein with reference to illustrative embodiments for particular applications, it should be understood that the invention is not limited thereto. Those skilled in the relevant art(s) with access to the teachings provided herein will recognize additional modifications, applications, and embodiments within the scope thereof and additional fields in which embodiments of the present invention would be of significant utility.

Reference in the specification to "one embodiment", "an embodiment" or "another embodiment" of the present invention means that a particular feature, structure or characteristic described in connection with the embodiment is included in at least one embodiment of the present invention. Thus, the appearances of the phrase "in one embodiment" or "in an embodiment" appearing in various places throughout the specification are not necessarily all referring to the same embodiment.

Embodiments of the present invention are directed to a method and system for a platform-based trust verifying service for multi-party verification. This is accomplished by leveraging platform hardware features to identify platform vulnerabilities. Multiple parties on the Internet, or any other network delivering protected content or other private services, may ascertain the posture of the platform in a trustworthy fashion without additional overhead on the platform.

Embodiments of the present invention enable authorized service providers to request a measurement and verification of platform attributes of a client host regarding the integrity of software and hardware components that are the source of any transaction between a client host and the service provider. Thus, only authorized services may ascertain the validity of the posture of the platform (i.e, the posture report). Embodiments of the present invention enable a client entity to ensure the integrity of software agents that convey data to the servers of the service providers, including software agents that acquire information through hardware on the platform, such as, for example, fingerprint readers or other sensors. The ability to ensure the integrity of the platform, including the software agents, is very important to businesses that provide online services, such as, for example, online advertising services, location-based services, premium content delivery services, etc. because these services depend on the accuracy of the data delivered by the software agents to provide these services.

Embodiments of the present invention also provide an OS (Operating System) agnostic capability that enables protection against a malicious authorized owner of the platform and malicious code on the platform.

Although the invention is described as being applicable to the Internet, the invention is not limited to the Internet. One skilled in the relevant art(s) would know that the invention is equally applicable to services over private networks such as, for example, an enterprise IT (Information Technology) network or a commercial network delivering protected content or other private services.

FIG. 1A is a block diagram illustrating an exemplary host platform 100 having an active management module according to embodiments of the present invention. Host platform 100 represents a computing platform that executes programs. In embodiments of the present invention, host platform 100 may be a client platform. Host platform 100 may include, for example, a desktop computer, a laptop computer, a tablet computer, a set top box, a personal digital assistant (PDA), a phone, a smart phone, a MID (Mobile Internet Device), a game machine, a health monitoring device, and other connected digital consumer devices. Host platform 100 comprises, inter alia, a host processor 102, a service processor 104 having an active management module 106, memory 108, storage 110, input/output devices 112, and communication interfaces 114. Each of components 102, 104, 106, 108, 110, 112 and 114 are coupled to each other via a system bus 116, which represents one or more buses. In the case of multiple buses, the buses may be bridged by one or more bus bridges (not shown).

Host processor 102 may represent a processor, microcontroller, central processing unit (CPU), etc. Although host processor 102 is shown as a single unit in FIG. 1A, host processor 102 may include one or more processing cores or processing units, which may provide parallel processing capabilities. Host processor 102 will be described in more detail below with reference to FIG. 2.

Service processor 104 represents a processor/control logic for performing tasks outside the context of host processor 102. In one embodiment, service processor 104 may be termed an "adjunct processor" and may be a partition of host processor 102, an embedded device, a chipset component, etc. Service processor 104 may also be implemented by host processor 102 when it executes management code on a secured/trusted partition or in a system management mode. In one embodiment, service processor 104 may include an active management module 106. Active management module 106 may alternatively exist as a separate entity on host platform 100 that works in conjunction with service processor 104. Active management module 106 may include an agent execution environment (AEE) 118 that may be used to determine the integrity of programs executing on host platform 100. AEE 118 will be discussed in further detail below with reference to FIG. 3.

In one embodiment of the present invention, service processor 104 may include an out-of-band (OOB) management 120. OOB management 120 refers to management and/or control of a communication resource that is inaccessible to an Operating System (OS) executing on host processor 102. OOB management 120 may include a communication link 126 with an entity external to host platform 100, such as, for example, a remote server 122 over a network, such as, for example, network 124. Communication link 126 may be a wired link or a wireless link. A wired link may comprise physical conductors, such as, for example, twisted pair, Cat-5, coaxial cable, fiber, etc. A wireless link may include, but is not limited to, WiFi (Wireless Fidelity, which is the common name for aerial network communication according to the IEEE 802.11 family of protocols), 3G (Third Generation of Mobile Communications Technology), WiMax (Worldwide Interoperability for Microwave Access, which is a broadband technology based on the IEEE 802.16 standard), etc. In one embodiment, remote server 122 may be connected to remote OOB management 120.

Memory 108 may be used to store/provide instructions and/or data to use for execution of direct operations and/or functions of host processor 102. Memory 108 may include random access memory (RAM), static RAM (SRAM), dynamic RAM (DRAM), synchronous DRAM (SDRAM), dual-data rate RAM (DDRRAM), etc. Memory 108 may include one or more sequences of code and/or data stored therein, and may be referred to as an operating memory. A code sequence can be a set or a group of machine instructions representing one or more function calls, one or more subroutines, or one or more operations. A program may refer herein to any one of these alone, as well as a conjunction of one or more of these.

Storage 110 may represent a non-volatile storage to store persistent data. Non-volatile storage refers to a medium of storage that retains its value even when power is removed from the storage device. Persistent data refers to data that is desired to be retained when power is interrupted to host platform 100, such as, for example, system files, operating system(s), program files, configuration files, etc. Storage 110 may include disks and associated drives (e.g., magnetic, optical), universal serial bus (USB) storage devices and associated ports, flash memory, read only memory (ROM), non-volatile semiconductor drives, etc.

Host platform 100 may also include input/output devices 112. Input/output devices 112 may include, but are not limited to, keyboards, cursor controls, etc.

Host platform 100 may also include communication interfaces 114. Communication interfaces 114 may include, but are not limited to, network interface cards, modems, etc. that enable host platform 100 to communicate with other entities over a network, such as, for example, network 124.

Figure 1B:
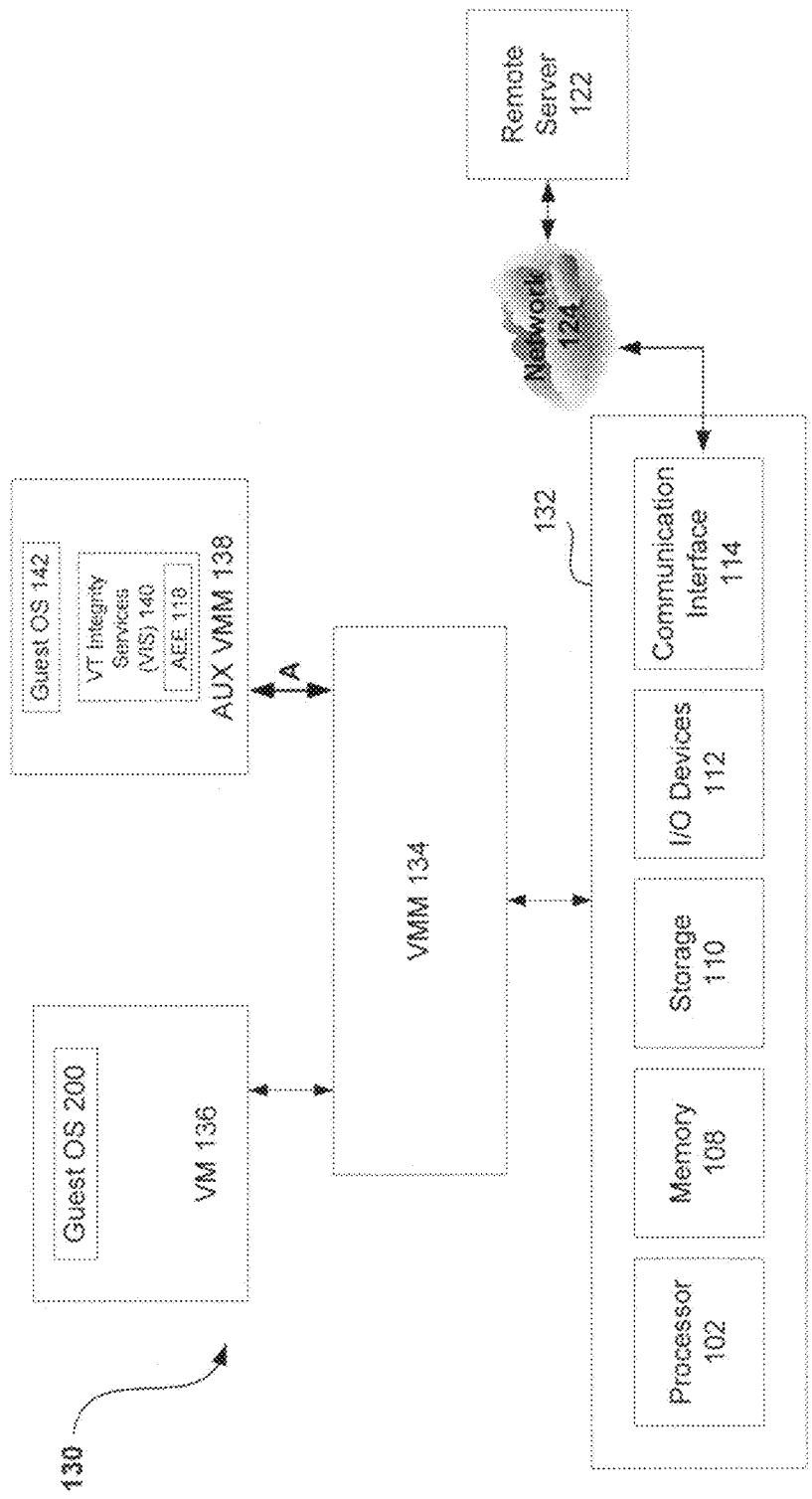
FIG. 1B is a block diagram illustrating an exemplary Virtualization Technology (VT) enabled host computing platform according to embodiments of the present invention.

FIG. 1B is a block diagram illustrating an exemplary virtualization technology (VT) host computing platform 130 according to embodiments of the present invention. In embodiments of the present invention, a secure isolated partition for AEE 118 is necessary. With the implementation of a VT computing platform, an isolated partition for AEE 118 may be created.

As indicated with host platform 100, host platform 130 represents a computing platform that executes programs. In embodiments of the present invention, host platform 130 may be used as a client platform or a server platform. Host platform 130 may include, for example, a desktop computer, a laptop computer, a tablet computer, a personal digital assistant (PDA) or other handheld computing or communication device, etc.

Host platform 130 comprises, inter alia, a plurality of Virtual Machine Monitor (VMM) managed components 132 having the VMM 134 running directly on top of VMM managed components 132. VMM managed components 132 may be implemented in hardware, software, firmware, or a combination thereof. VMM managed components 132 may include processor 102, memory 108, storage 110, I/O devices 112, and communication interface 114. Host platform 130 further comprises at least one Virtual Machine (VM) 136. VM 136 comprises operating system 200, which is described below with reference to FIG. 2. Host platform 130 also includes an auxiliary VM 138 having a guest operating system and a VT Integrity Services (VIS) module 140. VT Integrity Services (VIS) module 140 includes AEE 118. Although FIG. 1B is shown as having two VMs, VM 136 and auxiliary VM 138, platform 130 is not limited to having only two VMs. One skilled in the relevant art(s) would know that more VMs may be included in platform 130 without departing from the scope and spirit of the present invention.

Virtual machine monitor (VMM) 134 allows host platform 130 to run multiple guest Operating Systems (OSs) simultaneously and independently, with each OS having its own isolated environment, that is, VM 136 and auxiliary VM 138, for software execution. VMM 134 runs directly on top of VT enabled hardware (VMM managed components 132), such as, for example, processor 102, memory 108, storage 110, I/O devices 112, and communication interface 114, and has full access to all of the resources in platform 130. VMM 134 may present multiple views of the VT enabled hardware (132) to the independently operating VM 136 and auxiliary VM 138. VMM 134 may be implemented in software, hardware, firmware, and/or any combination thereof.

As previously indicated, VM 136 and auxiliary VM 138 contain guest Operating Systems (OSs) that run on top of VMM 134. VM 136 and auxiliary VM 138 are configured to execute code independently, with VM 136 and auxiliary VM 138 being securely isolated from each other. In other words, the components operating on VM 136 and auxiliary VM 138 may each operate as if they were each running on a dedicated computer rather than a virtual machine. Components on these VMs may control various events and have complete access to the VT enabled hardware (132). VMM 114 may manage VM access to the VT enabled hardware (132).

Auxiliary VM 138 may include a VT Integrity Services (VIS) module 140 to provide additional security enhancements. In conjunction with VIS module 140, auxiliary VM 138 may be configured to execute code independently, may be securely isolated from VM 136, and may prevent components of VM 136 from performing operations that would alter, modify, read, or otherwise affect the components of auxiliary VM 138. Thus, having AEE 118 reside on VIS module 140 enables AEE 118 to be more securely isolated from OS 200 implemented on VM 136. With this embodiment, AEE 118 communicates with OS 200 via communication link A and VMM 134.

As previously indicated with reference to FIG. 1A, although host processor 102 is shown as a single unit in FIG. 1B, host processor 102 may include one or more processing cores or processing units.

FIGS. 1A and 1B describe exemplary active management and VT implementations of embodiments of the present invention. The invention is not limited to these implementations. One skilled in the relevant art(s) will know that other implementations may be used that support the functionality of embodiments of the present invention. Such implementations may include, but are not limited to, a Trusted Computing Module implementation or an Advanced RISC Machine's (ARM's) Trust Zone implementation.

Figure 2:
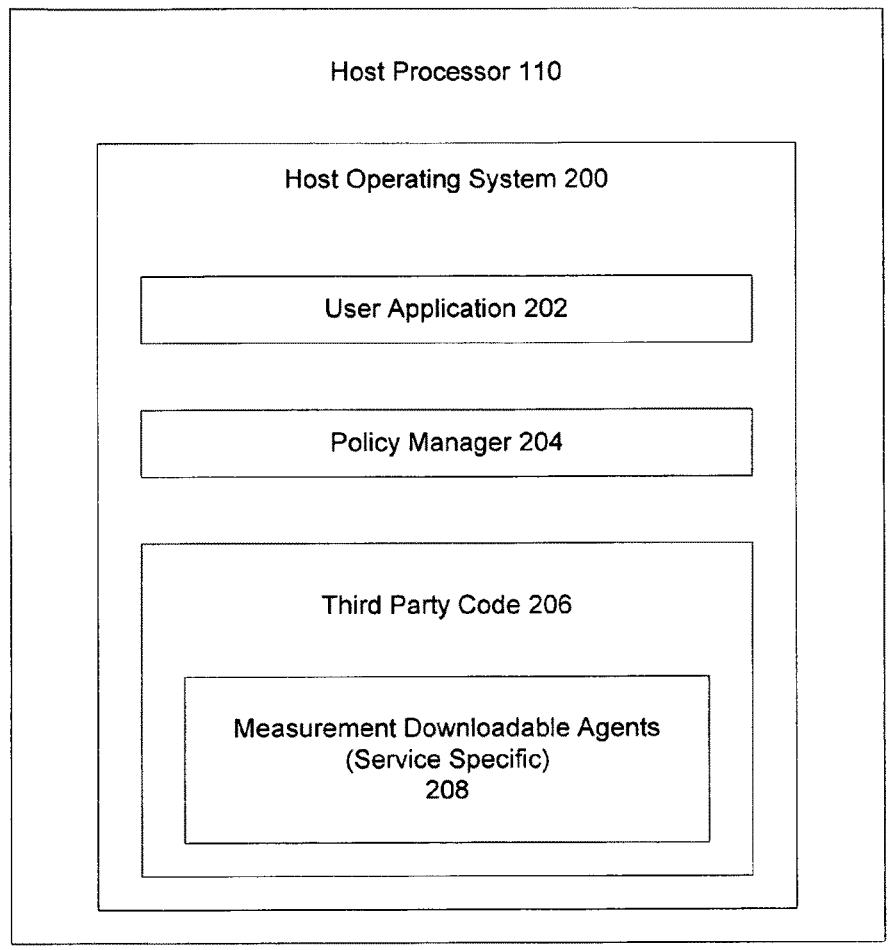
FIG. 2 is an exemplary block diagram illustrating a host processor and a host operating system for a platform-based trust verifying service according to an embodiment of the present invention.

FIG. 2 is an exemplary block diagram illustrating host processor 102 and a host operating system 200 for a platform-based trust verifying service according to an embodiment of the present invention. As previously indicated, host processor 102 may be, for example, a processor, microcontroller, central processing unit (CPU), etc. Host processor 102 comprises a host operating system 200. Host operating system 200 is a software component that is responsible for the management and coordination of activities and the sharing of resources for host platform 100 or 300. Host operating system 200 comprises, inter alia, user applications 202, a policy manager 204, and third party code 206.

User applications 202 may include, but are not limited to, any application particular to a service provider that supports their service delivery. For example, the most common user application today that supports service delivery for a service provider on the Internet may be a browser application, such as, for example, Internet Explorer by Microsoft® or Netscape Navigator by Netscape Communications Corporation, now a subsidiary of AOL. Other types of user applications that support service delivery for a service provider or act as an interface between a client and a service provider may also be used. For example, Netflix, an online movie rental service that provides movies and other types of media, requires a Nefflix media player application as an interface between the user and the Netflix website to enable the user to watch movies and television shows on the user's personal computer (PC).

Embodiments of the present invention provide the service provider with information to enable the service provider to know whether or not the user application running on a client has been tampered with or compromised. As part of host operating system 200, policy manager 204 provides the policies that define the state of the host platform as well as the state of the user application. Therefore, policy manager 204 may be accessible to the user, as well as the service provider, and gives the user/service provider the ability to configure default parameters and attributes for the platform and the user application that may be used to define the state of the host platform and the state of the user application representative of the service provider.

Host operating system 200 also includes third party code 206. Third party code 206 comprises code from authorized service providers and/or other authorized Independent Software Vendors (ISVs). Third party code 206 may be referred to as agents, and more particularly, as measurement downloadable agents 208. Service providers are provided with a standard SDK (Software Developer Kit) to implement and install their measurement downloadable agents 208 in the memory region of third party code 206. Thus, measurement downloadable agents 208 may be service provider specific. They are used to measure the user applications that are service provider specific. For example, as previously indicated, the user application interface for Nefflix is a Netflix media player. The third party code for Nefflix is a measurement downloadable agent that measures the Netflix media player (that is, the checker code for the Nefflix media player to make sure that the Nefflix media player code is operating properly, without modification or compromise). Measurement downloadable agents are also used to measure certain platform specific attributes such as, for example, the OS version, anti-virus software version information, and properly functioning hardware, and to ensure the integrity of the agents that convey data to the servers of the service providers.

Figure 3:
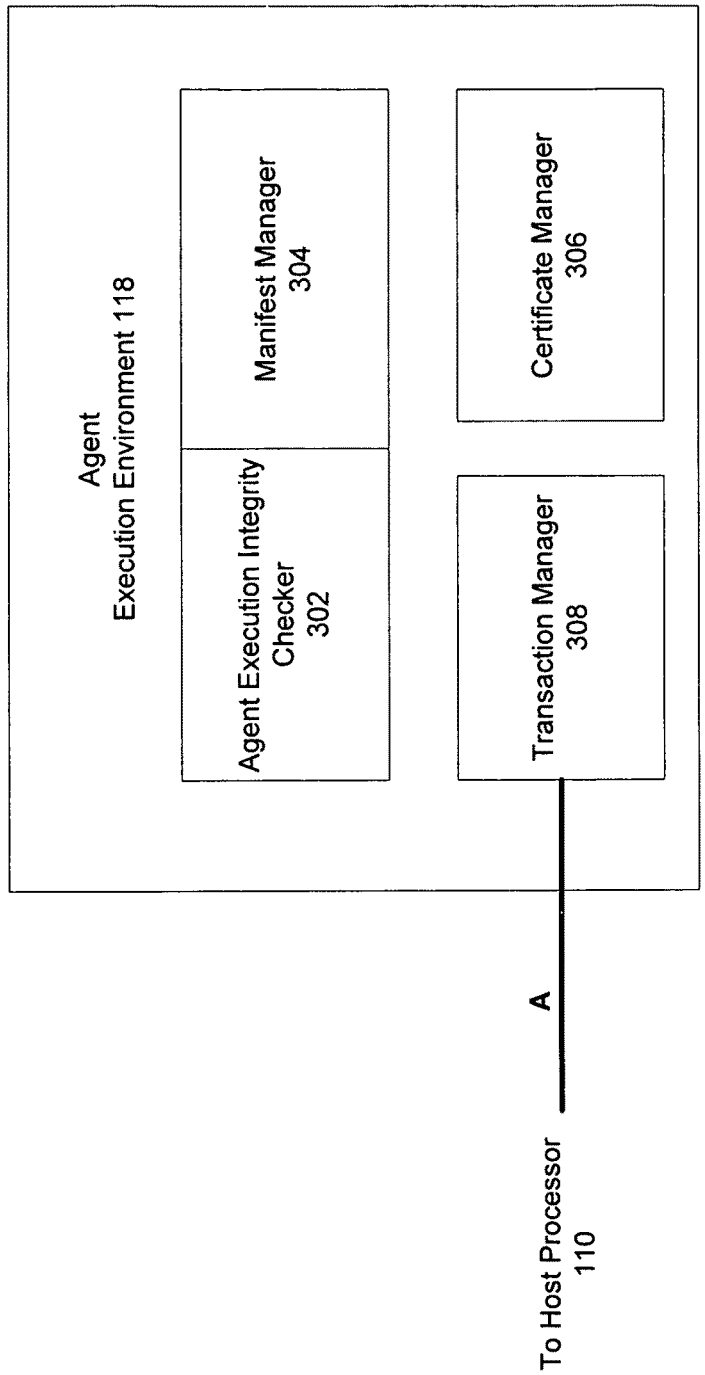
FIG. 3 is a block diagram illustrating an exemplary agent execution environment (AEE) for a platform-based trust verifying service according to an embodiment of the present invention.

FIG. 3 is a block diagram illustrating an exemplary Agent Execution Environment (AEE) 118 for a platform-based trust verifying service according to an embodiment of the present invention. In embodiments of the present invention, Agent Execution Environment (AEE) 118 monitors and measures protected host software agents, such as, for example, user applications and third party code executing on host platform 100 so that these software programs can be protected from modification and/or malicious termination. AEE 118 also measures critical operating system components that demonstrate the overall operating system state and the services it provides. AEE 118 may measure certain platform specific attributes, such as, for example, the operating system version, an anti-virus program version and other software program versions installed on the platform.

In embodiments of the present invention, software programs and third party code 206 may be directly monitored by Agent Execution Environment (AEE) 118. Embodiments of the present invention use a "check the checker" approach by employing AEE 118 to check third party code agents 206. For example, anti-virus software is used today to detect, remove, and block spyware and viruses on a platform, but who checks the integrity of the anti-virus software. With embodiments of the present invention, AEE 118 may be used to check the integrity of the anti-virus software. Thus, in this instance, the anti-virus software is the checker and AEE 118 is the check used to "check the checker".

As previously indicated, AEE 118 may be isolated from operating system 200 to provide a closed measurement system capable of obtaining advanced measurements outside of operating system 200 to verify any software component on the host platform (100 or 130), including software components from service providers. Thus, it is important that AEE 118 be isolated from OS 200 to enable AEE 118 to have its own private area, separate from OS 200, to store data and runtime information that cannot be compromised by OS 200.

AEE 118 ensures the integrity of any software component, including third party code 206, by comparing a stored integrity manifest with a run time integrity manifest. The identity of a software program may be defined by two attributes: first, a listing of relocation fix-ups that occur at the time the program is loaded into memory; and second, an agent signature. The agent signature includes an integrity check value (ICV) or test value/identity test/verification value that may cover the program's executable code store, static configuration data, dynamic configuration data, and the listing of relocation fix-ups. A relocation fix-up may be described as referring to an offset applied to a location in the source of a program that references a program/routine/function that has a variable location based on where in memory the program is loaded. Collectively the listing of relocation fix-ups and ICV may be referred to as a software program's identity. When they are stored or used together, they can be referred to as a software program's "integrity manifest."

In one embodiment, an integrity check may include generating cryptographic hashes across all regions that represent an agent or software program's identity. The agent or software program's identity may include the executable code, static configuration data, and relocation fix-ups. The various components of the agent's or software program's identity can be used to generate particular integrity check values (ICVs). The ICVs are included in the agent's or software program's integrity manifest and can be verified to determine the identity and integrity of the agent/software program. The computed hash is compared against a known/expected value (i.e., an original integrity manifest) for the agent/software program that may have been generated at the time the agent was manufactured.

In one embodiment, an ICV may be generated with a cryptographic hashing algorithm. The algorithm may be used to generate one or more ICVs that are stored in an agent/software program's integrity manifest. An ICV stored in the agent's/software program's integrity manifest may be referred to as an "original ICV." The original ICV may also be referred to herein as a "known good" ICV. AEE 118 may generate an ICV to compare to an original ICV with the same cryptographic hashing algorithm used to create the original ICV. The computed ICV is compared with the known good ICV or original ICV. If the ICVs match, then the agent/software program has not been modified. If there is a difference in the computed ICV, the agent/software program is determined by AEE 118 to have been modified, and the differences may be reported.

In addition to the ICVs, the integrity manifest may include a cryptographic signature across the ICVs. The integrity manifest signature may be created by a software manufacturer/developer, and stored with an integrity manifest that is part of the software. The signature may alternatively be generated and/or received from the manufacturer at installation of the software program and stored as part of the program. The signature may be a cryptographic hash of the generated ICVs of the various parts of the software program. In one embodiment, the cryptographic hash may be performed by the software developer with a private key of a public-private key pair. Thus, the software developer may create and store the signature of the integrity manifest, and then another entity, such as AEE 118, can verify the signature with the software developer's public key. By verifying the signature of the integrity manifest, AEE 118 may assume that all values in the integrity manifest are correct, and use the ICVs of the integrity manifest as expected values for verification by AEE 118 or another entity.

AEE 118 also has access to important system tables such as, for example, a System Service Descriptor Table, an Interrupt Descriptor Table, and an Import Address Table. With privileged access to such tables, AEE 118 may ensure that system calls made by third party code get translated to the correct kernel code and not to any function calls hooked by rootkit code.

AEE 118 comprises an agent execution integrity checker 302, a certificate manager 306, and a transaction manager 308.

Agent execution integrity checker 302 continuously monitors the memory region of third party code 206 on host operating system 200 along with any software components installed in that region. Agent execution integrity checker 302 includes a manifest manager 304. Manifest manager 304 maintains a repository of hashes of third party code 206 and any software agents in that region. Manifest manager 304 may also establish a secure channel with a remote server, such as, for example, remote server 122, to retrieve the integrity manifest for its third party code if the integrity manifest is not stored locally. When a measurement and verification request is made by a service provider, agent execution integrity checker 306 in conjunction with manifest manager 304 perform the measurement and verification by measuring the operating state of the client platform, determining a runtime integrity manifest, and performing an integrity manifest comparison as described above.

Certificate manager 306 maintains the certificate store. The list of keys/certificates maintained by certificate manager 306 include (1) a public key pair for AEE 118 (which may be fused while manufacturing the hardware (AEEPK) or generated after customer activation) and (2) a service certification key (SCK) issued by a service provider to make sure that an agreement between the client and the service provider is in place and is used when authenticating the agents running in third party code 206. Certificate manager 306 also provides processes for revocation and renewal of certificates.

Transaction manager 308 instructs host processor 102 to perform additional operations to form the binding between AEE 118 and any transactions performed by host processor 102.

In one embodiment, communication link A between transaction manager 308 and host processor 102 may involve extensions to the existing processor microcode. New processor registers may be defined that may be used to watch certain regions of host memory (such as Memory Type Range Registers (MTRRs)) and if those regions are modified, then an alert may be sent to AEE 118.

As previously indicated, embodiments of the present invention enable service providers to request measurement and verification of a client platform to ensure that the service provider's user application running on the client platform has not been compromised and that their services cannot be stolen. Numerous online businesses are in need of such a service to prevent cyber theft of their services. For example, a user rents a movie from Netflix.com to view the movie in the Nefflix media player on the user's client platform. However, if the user's client platform on which the user is viewing the movie, i.e., the Nefflix media player, is compromised by malicious video rippers, then the movie can be stolen from the Netflix media player without renting the movie from Netflix.com. Embodiments of the present invention provide all the necessary components to measure and verify the client platform, including measurement of the service provider's user application, to make sure that the user application has not been compromised. For example, with embodiments of the present invention, Netflix.com may request a measurement and verification to ensure that the Nefflix media player on which the movie is being played has not been compromised and thus can be sure that the movie has not been stolen by a malicious video ripper.

Thus, embodiments of the present invention enable multiple parties on the Internet, or any other network in which services are provided, to ascertain the posture of the platform in a trustworthy fashion without additional overhead on the platform. As shown below with reference to FIG. 4, embodiments of the present invention also enable authorized services only to ascertain the validity of the posture report. Embodiments of the present invention are also OS agnostic and provide protection against a malicious authorized owner of a platform and malicious code on a platform.

Figure 4:
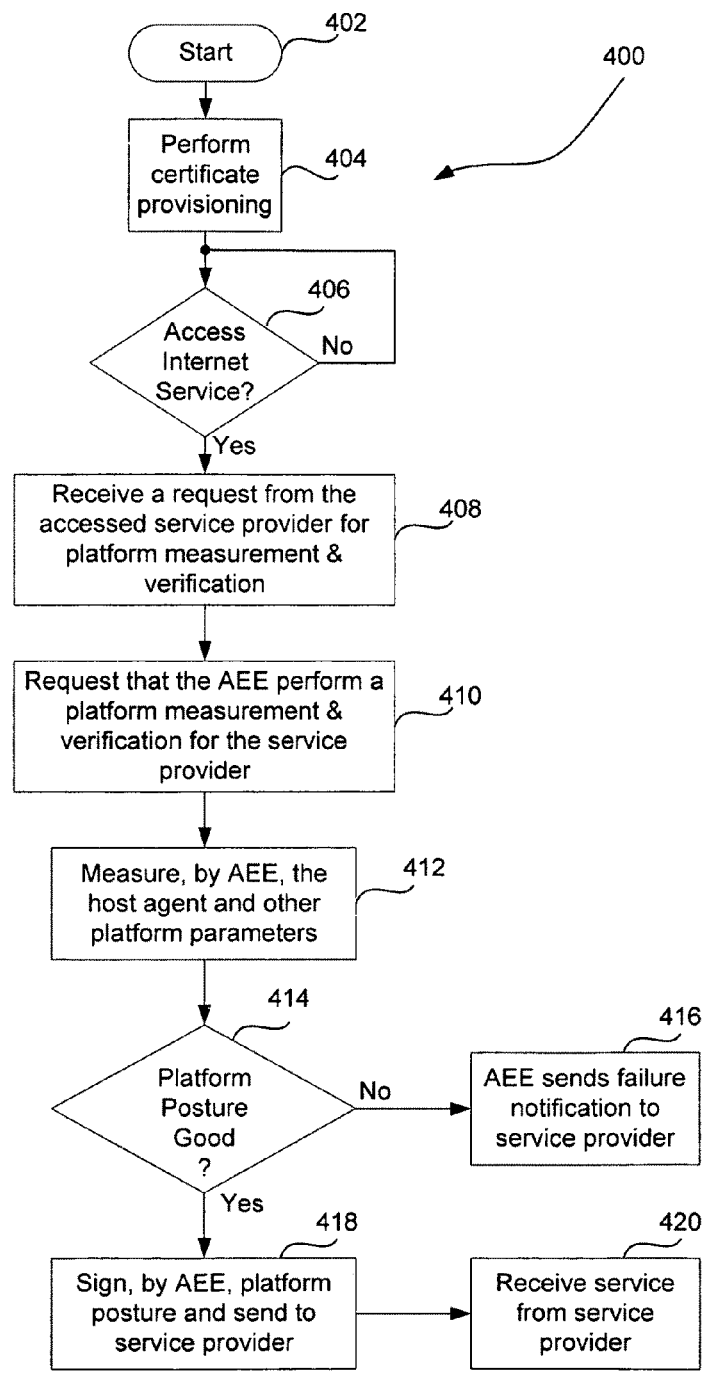
FIG. 4 is a flow diagram describing an exemplary method for a platform-based trust verifying service according to an embodiment of the present invention.

FIG. 4 is a flow diagram 400 describing an exemplary method for a platform-based trust verifying service according to embodiments of the present invention. The invention is not limited to the embodiment described herein with respect to flow diagram 400. Rather, it will be apparent to persons skilled in the relevant art(s) after reading the teachings provided herein that other functional flow diagrams are within the scope of the invention. The process begins at 402, where the process immediately proceeds to 404.

Trust must first be established before it can be verified. In other words, before the AEE can check the checker (i.e., third party agent), trust must be established between the AEE and the third party agent. To establish the trust, the certificates for the third party agents must be furnished to the AEE. Thus, at 404, certificate provisioning is performed by the AEE. Certificate provisioning is well known in the art. As previously indicated, the certificate manager maintains the certificate store. A service certification key (SCK) is issued by a service provider to make sure that an agreement between the service provider and the client is in place prior to the service provider providing a service to the client. If the service provider has already been provisioned, a service certification key should already be stored with the certificate manager. The service certification key (SCK) may then be used to authenticate the third party agents.

Upon the host platform accessing an Internet service from a service provider at 406, the host platform receives a request from the corresponding service provider for platform measurements and verification at 408. The service provider, not wanting to be compromised by the host platform if the host has been comprised, makes this request before providing any services to the host platform.

In response to the request from the service provider, the host platform measurement agent (i.e., the third party code respective of the service provider) requests that the AEE perform a platform measurement and verification for the service provider at 410. The platform measurement and verification includes measuring the state of the third party code as well as measuring critical operating system components that demonstrate the overall operating system state and the services it provides.

At 412, the manifest manager of the AEE performs an integrity manifest comparison of the third party code associated with the service provider. To perform a manifest comparison, the manifest manager must first perform a runtime integrity manifest computation of the third party code as described above. The runtime integrity manifest is compared against the original integrity manifest stored in the manifest manager. In one embodiment, if the original integrity manifest is not stored in the manifest manager, then the original integrity manifest may be retrieved from the service provider as described above.

If the original integrity manifest and the runtime integrity manifest are not equivalent, or if the overall operating system state of the client platform is not satisfactory, then the host platform posture will not be considered good at 414, and the AEE will send a failure notification to the service provider at 416. The failure notification puts the service provider on notice that the host platform has been compromised. After receiving the notification, the service provider must decide what action to take.

If the original integrity manifest and the runtime integrity manifest are equivalent and the overall operating system state of the client platform is satisfactory, then the host platform posture is considered good at 414, and the AEE may sign the platform posture and send the approval to the service provider at 418.

At 420, the host platform may receive the service from the service provider since the service provider has been assured that the operating system state of the host platform and the service provider's third party code have not been compromised.

Certain aspects of embodiments of the present invention may be implemented using hardware, software, or a combination thereof and may be implemented in one or more computer systems or other processing systems. In fact, in one embodiment, the methods may be implemented in programs executing on programmable machines such as mobile or stationary computers, personal digital assistants (PDAs), set top boxes, cellular telephones and pagers, and other electronic devices that may include a at least one processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that embodiments of the invention may be practiced with various computer system configurations, including multiprocessor systems, minicomputers, mainframe computers, and the like.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the methods described herein. Alternatively, the methods may be performed by specific hardware components that contain hardwired logic for performing the methods, or by any combination of programmed computer components and custom hardware components. The methods described herein may be provided as an article or a computer program product that may include a machine readable medium having stored thereon instructions that may be used to program a processing system or other electronic device to perform the methods. The term "machine readable medium" or "machine accessible medium" used herein shall include any medium that is capable of storing or encoding a sequence of instructions for execution by the machine and that causes the machine to perform any one of the methods described herein. The terms "machine readable medium" and "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

What is claimed is:

1. A trust verification method comprising:
performing, by an agent execution environment operating on a client device, third party certificate provisioning to establish trust between the client device and a service provider;
transmitting, by the client device, a request to the service provider to access a service provided by the service provider;
receiving, by the client device, a request from the service provider for verification of platform posture information of the client device, the request provided by the service provider to the client device in response to the request from the client device to the service provider to access the service provided by the service provider, the platform posture including measurements indicating a state of an operating system residing on the client device;
in response to the request from the service provider,
establishing, by the agent execution environment operating on the client device, a secure channel with the service provider, the secure channel configured to facilitate retrieval of an integrity manifest for third party code from the service provider;
collecting, by the agent execution environment operating on the client device, one or more measurements related to the platform posture information on the client device;
comparing, by the agent execution environment operating on the client device, the one or more measurements to one or more previously known good values;
determining, by the agent execution environment operating on the client device, that the client device has a good platform posture based on said comparing; and
transmitting, by the agent execution environment operating on the client device, an approval of the platform posture information to the service provider; and
receiving, by the client device, the service from the service provider based on said transmitting of the approval,
wherein the agent execution environment is isolated from the operating system and is configured to include a memory area to store the measurements related to the platform posture information, inaccessible by the operating system.

2. The method of claim 1, further comprising:
transmitting, by the client device, another request to another service provider for another service;
receiving, by the client device, another request for verification of the platform posture information from the other service provider;
determining, by the client device, that the client device has a bad platform posture;
sending, by the client device, a failure notification to the other service provider, wherein the failure notification puts the other service provider on notice that the client device has been compromised.

3. The method of claim 1, further comprising prior to said transmitting a request to a service provider, provisioning the service provider.

4. The method of claim 1, further comprising prior to said transmitting of the approval to the service provider, signing, by the client device, the platform posture information indicating the approval.

5. The method of claim 1, wherein said collecting one or more measurements includes measuring critical operating system components and applications that indicate an overall operating system state and generating an integrity manifest.

6. The method of claim 5, wherein said generating an integrity manifest includes:
performing a runtime integrity manifest computation for the third party code representative of the service provider;
and wherein said comparing the one or more measurements includes: comparing the runtime integrity manifest to a stored integrity manifest for the service provider if the stored integrity manifest exists on the client device.

7. The method of claim 6, wherein said comparing the one or more measurements further includes if a stored integrity manifest does not exist, retrieving the integrity manifest for the third party code from the service provider via the secure channel, and comparing the runtime integrity manifest with the retrieved integrity manifest.

8. The method of claim 1, wherein said comparing is performed by an agent execution environment of the client device.

9. The method of claim 1, further comprising authenticating, by the client device, the third party code on the client device that is representative of the service provider.

10. The method of claim 1, wherein said collecting of measurements and said comparing of measurement are operating system (OS) agnostic.

11. The method of claim 1, wherein the service provider includes an authorized service provider.

12. An article comprising: a tangible and non-transitory computer-readable storage medium having a plurality of machine accessible instructions, wherein upon execution of the instructions by an agent execution environment of a computing platform operating an operating system, causes the agent execution environment the computing platform to perform operations including:
performance of third party certificate provisioning to establish trust between the computing platform and a service provider to authorize the service provider;
transmission of a request to the authorized service provider to access a service provided by the service provider;
receipt of a request from the authorized service provider for verification of platform posture information, the request from the authorized service provider being provided by the service provider to the computing platform in response to the request from the computing platform to the service provider to access the service provided by the service provider;
in response to the request from the authorized service provider,
establishment of a secure channel with the service provider, the secure channel configured to facilitate retrieval of an integrity manifest for third party code from the service provider;
generation of the integrity manifest for the third party code of the computing platform that is specific to the authorized service provider;
comparison of the integrity manifest to a previously known good value;

determination of the computing platform as having a good platform posture based on said comparison;

sign an approval of platform posture information; and sending send the approval to the authorized service provider; and receive the service from the authorized service provider based on said sending of the approval, wherein the agent execution environment is isolated from the operating system and is configured to include a memory area to store measurements related to determination of the platform posture information, and wherein the memory area is inaccessible by the operating system.

13. The article of claim 12, wherein the operations further include:

transmitting another request to another service provider for another service;

receiving another request for verification of the platform posture information from the other service provider;

determining that the computing platform has a bad platform posture;

sending a failure notification to the other service provider, wherein the failure notification puts the other service provider on notice to protect the authorized service provider against any malicious code on the computing platform.

14. The article of claim 12, wherein the operations further include provisioning the authorized service provider.

15. The article of claim 13, wherein said generating the integrity manifest includes performing a runtime integrity manifest computation for the third party code; and wherein said comparing the integrity manifest includes comparing the runtime integrity manifest to a stored integrity manifest for the authorized service provider if the stored integrity manifest exists on the computing platform.

16. The article of claim 15, wherein said comparing the one or more measurements further includes if a stored integrity manifest does not exist on the computing platform, retrieving the integrity manifest from the authorized service provider via the secure channel, and comparing the runtime integrity manifest with the retrieved integrity manifest.

17. The article of claim 12, wherein said generating and comparing is performed by an agent execution environment of the computing platform that is operating system (OS) agnostic, and wherein the agent execution environment is configured to measures critical OS components and applications of the computing platform to determine the overall operating system state and configured to perform the integrity manifest comparison.

18. The article of claim 12, wherein the operations further includes authenticating the third party code for the authorized service provider.

19. The article of claim 12, wherein a good platform posture indicates that the client platform has not been compromised.

20. A trust verification system comprising:

a client platform, the client platform having at least one processor, wherein the at least one processor operates at least one operating system, wherein the at least one operating system includes one or more user applications, a policy manager, and a plurality of third party code, wherein the third party code includes measurement downloadable agents specific to service providers, wherein the client platform further includes an agent execution environment isolated from the at least one processor and from the operating system, wherein the agent execution environment is configured to:

perform third party certificate provisioning to establish trust between the client device and a service provider; and in response to a request from a server provider for verification of platform posture information of the client platform, the request received in response to a request communicated from a client platform to the service provider to access a service provided by the service provider, establish a secure channel with the service provider, the secure channel configured to facilitate retrieval of an integrity manifest for the third party code from the service provider;

monitor and measure critical operating system components that demonstrate an overall operating system state of the client platform, perform an integrity manifest verification of at least one of the plurality of third party code, and inform the service provider as to whether the client platform and the third party code respective of the service provider have been compromised based on the integrity manifest verification wherein the agent execution environment is configured to include a memory area to store measurements related to the platform posture information, and wherein the memory area is inaccessible by the operating system.

21. The system of claim 20, wherein the agent execution environment includes a manifest manager to perform the integrity manifest verification.

22. The system of claim 20, wherein the agent execution environment includes an agent execution integrity checker to monitor the plurality of the third party code, the agent execution integrity checker including a manifest manager to maintain a repository of hashes for each of the plurality of the third party code.

23. The system of claim 20, wherein the agent execution environment includes a certificate manager to maintain a certificate store, the certificate store including a plurality of certificates for provisioning, the certificates including service certification keys (SCKs) issued by a plurality of service providers to make sure that agreements between the client platform and each of the plurality of service providers are in place, wherein the SCKs are configured to facilitate authentication of the third party code running on the client platform.

24. The system of claim 20, wherein the agent execution environment includes a transaction manager to instruct the at least one processor to perform additional operations to form a binding between the agent execution environment and any transactions performed between the client platform and the plurality of service providers.

25. The system of claim 20, wherein the agent execution environment is operating system (OS) agnostic and provides protection against a malicious user of the platform and/or malicious code on the platform.

26. The system of claim 20, wherein the agent execution environment is further configured to ascertain a posture of the platform in a trustworthy fashion without additional overhead from the client platform.

* * * * *

UNITED STATES PATENT AND TRADEMARK OFFICE
CERTIFICATE OF CORRECTION

PATENT NO. : 8,572,692 B2  
APPLICATION NO. : 12/215907  
DATED : October 29, 2013  
INVENTOR(S) : Sunder et al.

Page 1 of 1

It is certified that error appears in the above-identified patent and that said Letters Patent is hereby corrected as shown below:

In the Claims

Column 12

Line 34, Claim 10, "...comparing of measurement..." should read - ...comparing of measurements...

Lines 40-44, Claim 12, "...,wherein upon execution of the instructions by an agent execution environment of a computing platform operating an operating system, causes the agent execution environment the computing platform to perform operations including:..." should read - ..., wherein execution of the instructions by an agent execution environment of a computing platform operating an operating system causes the agent execution environment of the computing platform to perform operations including:...

Column 13

Line 4, Claim 12, "...sending send..." should read - ...send...

Line 48, Claim 17, "...configured to measures..." should read - ...configured to measure...

Lines 52-53, Claim 18, "...operations further includes..." should read - ...operations further include...

Signed and Sealed this  
Fifth Day of May, 2015

Michelle K. Lee  
*Director of the United States Patent and Trademark Office*